United States Patent [19]

Taylor

[11] 4,089,926

[45] May 16, 1978

[54] INJECTION MOLDING METHOD AND APPARATUS

[76] Inventor: Don A. Taylor, Box 4, Wadsworth, Ohio 44281

[21] Appl. No.: 725,013

[22] Filed: Sep. 20, 1976

[51] Int. Cl.² .............................................. B29F 1/08
[52] U.S. Cl. .................................. 264/294; 264/329; 425/543; 425/547
[58] Field of Search ..... 425/243, 251, 190, DIG. 229, 425/247, 547, 544, 548, 543, 588; 249/78; 264/328, 297, 329, 294

[56] References Cited

U.S. PATENT DOCUMENTS

| | | | |
|---|---|---|---|
| 2,300,759 | 11/1942 | Amigo | 425/DIG. 229 |
| 3,671,624 | 6/1972 | Antalek | 264/294 |
| 3,748,075 | 7/1973 | Taylor | 425/251 |
| 3,776,998 | 12/1973 | Church | 264/297 X |
| 3,819,312 | 6/1974 | Arpajian | 425/243 X |
| 3,836,306 | 9/1974 | Pasch et al. | 425/547 |
| 3,859,024 | 1/1975 | Pasch et al. | 425/251 |
| 3,876,356 | 4/1975 | Fazekas | 425/243 X |
| 3,961,014 | 6/1976 | Pasch | 264/328 X |

*Primary Examiner*—Francis S. Husar
*Assistant Examiner*—William R. Briggs
*Attorney, Agent, or Firm*—Reese Taylor

[57] ABSTRACT

An improved injection molding method and apparatus for use with a press that is movable between open and closed positions is disclosed which involves the utilization of a mechanical temperature control assembly which includes a laminated plate assembly comprising a plurality of plates movable into and out of the contact with the usual cavity containing mold sections and which includes heating and insulation components so that when the plate assembly is interposed in contact with the cavity containing molds within the bite of the press, the material supply source is insulated from the high molding temperature, thereby avoiding pre-mature cure of the material contained in the supply source while insuring complete cure of the cavity material.

9 Claims, 6 Drawing Figures

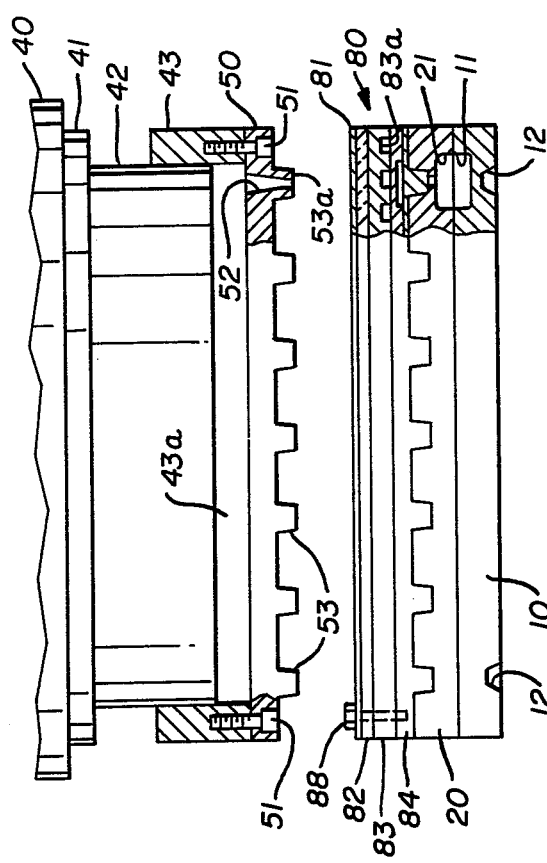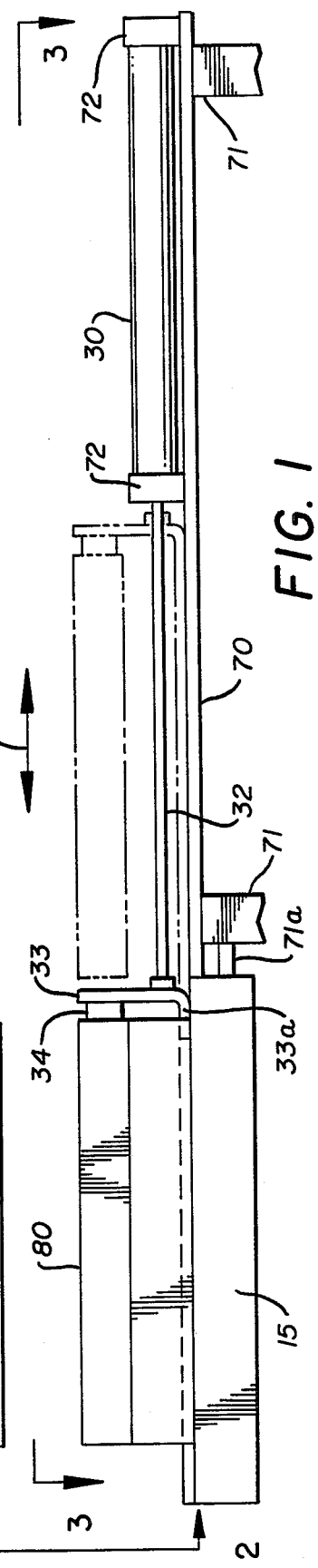

INJECTION MOLDING METHOD AND APPARATUS

FIELD OF THE INVENTION

This invention in general relates to injection molding of elastomeric materials and, in particular, relates to a means for improving a cold runner system by utilizing mechanical means to eliminate waste due to pre-mature curing of the material contained in the pot or other material supply source.

DESCRIPTION OF THE PRIOR ART

In the prior art of injection molding, both hot and cold runner systems are utilized, with the cold runner system being utilized with elastomeric material to keep the pot material or the runner system below scorch to avoid pre-mature curing and thereby wasting of the material. With thermoplastic materials, the reverse situation exists in that a hot runner system is utilized with the same object in mind; namely, to eliminate waste by preventing the material in the pot or transfer apparatus from curing up with the material remaining in the actual mold cavity.

This waste material is a very significant economic problem and can range from twenty to over one hundred percent relative to the cavity volume and the number of cavities in the mold.

The above-noted cold runner systems which are known to Applicant generally involve a relatively complicated apparatus to maintain the temperature differential between the pot material and the cavity material. Present methods usually utilize water circulating means and/or insulating materials to isolate and protect the material in the pot or the runner system. In order to achieve this result, the molds are quite complex and sophisticated and consequently expensive. Furthermore, the present systems generally are quite complex, particularly in view of the fact that the temperature parameters involved are very critical and difficult to control.

Some attempts have been made to alleviate this problem (see, for example, Jurgeliet U.S. Pat. No. 3,121,918); but problems are still encountered, particularly in the sprue and runner systems.

SUMMARY OF THE INVENTION

It has been found that the aforementioned disadvantages can be obviated by utilizing, in conjunction with a conventional press of the type well known in the trade, a temperature control assembly which can be moved into and out of contact with the molding plates themselves.

It has been discovered that if the upper press platen is provided with a closure plate covering the "pot" or storage area for the uncured material and having a plurality of projecting ribs and sprue openings therein, that the top mold plate can be provided with complemental recesses to receive the ribs, whereby the material can be injected into the mold cavity in a generally conventional fashion.

It has been found, however, that following this the press clamping pressure can be released and the actual cavity mold can be moved away from the closure plate, and a heat control assembly can be moved into position between the closure plate and the cavity mold.

It has been discovered that this heat control assembly can include an insulating plate, a plurality of metal reinforcing plates and a heating element with the bottommost plate having ribs which will again be complemental to the openings in the actual cavity mold. In this fashion, when clamping pressure is reapplied and the press is reclosed, the heat control assembly mechanically is interposed between the pot and the cavity containing mold and thereby the pot material and the cavity material so that the necessary curing heat can be applied to the material in the cavity to achieve curing without subjecting the pot material to this same elevated temperature and thereby preserving it in its uncured state.

Accordingly, production of an improved injection molding apparatus and method of the character above described becomes the principal object of this invention, with other objects thereof becoming more apparent upon a reading of the following specification, considered and interpreted in view of the accompanying drawings.

OF THE DRAWINGS

FIG. 1 is an elevational view showing the transfer means for inserting the heat control assembly into the bite of the press.

FIG. 2 is an elevational view, partially in section, taken along the line 2—2 of FIG. 1 showing the press and mold assembly.

BRIEF DESCRIPTION OF THE PREFERRED EMBODIMENT

Figure 3:
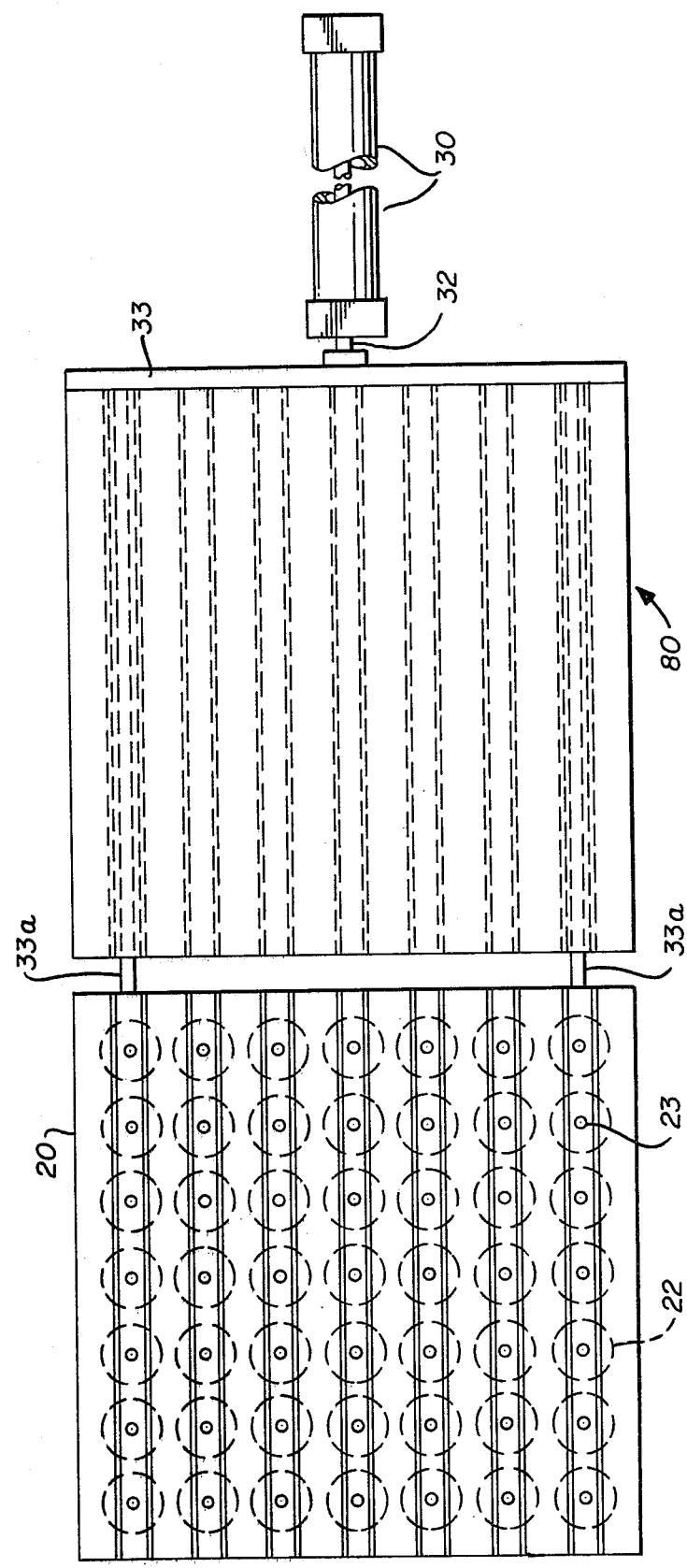
FIG. 3 is a plan view taken along the line 3—3 of FIG. 1.

Referring first to FIGS. 1 and 2, it will be noted that the overall assembly includes certain basic components. These are a bottom mold plate 10, top mold plate 20, cylinder 30, a fixed upper press platen 40, movable lower press platen 15, and the heat control assembly 80.

Referring specifically to FIG. 2 then, the bottom mold plate 10 is conventional in nature and includes at least one molding cavity 11, with plate 10 being carried on lower platen 15 for movement therewith. It should be understood that any number of these cavities could be employed, although only one is illustrated here, and also that their configuration would, of course, be dictated by the configuration of the product being cured therein.

The bottom surface of the bottom plate 10 also has a plurality of elongate notches or recesses 12, 12 which will mate with bottom legs 33a of brackets 33, 33, as will be described below for alignment purposes.

The upper or top mold plate 20 also has at least one molding cavity 21, with it being understood that the cavities of plates 10 and 20 are aligned so that when the two plates 10 and 20 are placed together, as shown in FIG. 2 for example, cavities 11 and 12 will mate and form the article forming cavity. Plate 20 also has a plurality of elongate recesses 22, with a plurality of gates 23 in the bottom surface 22a thereof which communicate with the article molding cavity 21 for purposes which will be described. The number of gates will correspond to the number of cavities 21, 21 contained in plate 20.

It will be noted that the apparatus for joining and separating plates 10 and 20 and the apparatus for stripping the finished product from the cavity have not been illustrated. This structure is well known in the art and really forms no part of the present invention.

It should be understood, however, that the assembly formed by bottom and top mold plates 10 and 20 is movable in the direction of the arrow 100 (see FIG. 5) for purposes which will be described below.

Referring again to FIG. 2, it will be noted that the upper press platen 40 is provided with a ram plate 41 secured thereto and carrying a transfer pot ram 42. Similarly, a material pot frame 43 is provided. Secured to the pot 43 is a closure plate 50 which is bolted to the pot by bolts 51, 51. In this fashion, a material containing cavity 43a is provided between the ram 42 and the top of the plate 50. Most of this structure has not been illustrated in great detail since it is essentially conventional in the art and, therefore, to some extent has been illustrated schematically. It is also noted that the specific material supply source illustrated, namely the pot, is illustrative only; and this invention can be used with other material supply sources such as a single nozzle and a runner system, for example.

The closure plate 50 does have a plurality of projecting elongate ribs 53, 53 which have sprue openings 52, 52 in the bottom surface 53a thereof. Again, the number of ribs will correspond to the number of recesses 22 in plate 20 and, of course, the number of sprue openings 52 would be dictated by the number of mold cavities and gates 23. The invention is not intended to be in any way limited to any particular number of cavities or, for that matter, configuration of cavities.

Turning next then to the heat control plate assembly 80, it will be noted that this is a sandwich or lamination of several members. At the top is a first plate 81 which would preferably be a metal plate intended to receive pressure, as will be described.

Disposed beneath plate 81 is a layer of insulating material 82 and beneath that is a second metal plate 83. This second plate has a plurality of apertures or slots 83a, 83a formed between ribs 83b, 83b. These slots are for cooling purposes, and the ribs are for pressure purposes, as will be described below.

Figure 6:
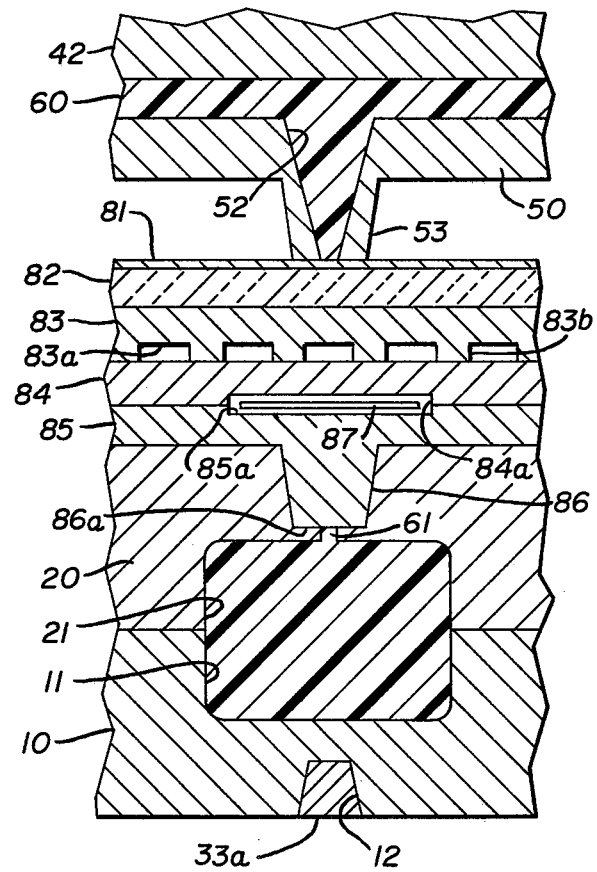
FIG. 6 is a view similar to FIGS. 4 and 5 showing the heat control assembly in place with the mold closed during the curing operation.

Third and fourth metal plates 84 and 85 are also provided in the assembly 80, and they each have at least one mating aperture therein indicated by the numerals 84a, 85a. A heating element 87 is received within this aperture, as shown in FIG. 6. Furthermore, at least one elongate projecting or depending rib 86 is provided on the bottom of the fourth plate 85, and this rib has a configuration which is complemental to the recess 22 in the top mold plate 20. The number of ribs 86 will complement the number of recesses 22. The entire assembly 80 is held together by bolts, such as 88, to form a unitary assembly.

Finally, referring to FIGS. 1 and 3, it will be noted that the transfer mechanism includes a support table 70 with depending legs 71, 71 and cylinder support brackets 72, 72. This table is attached to bottom platen 15 by braces 71a for movement therewith, as will be described below. A cylinder 30 is mounted on the brackets 72, 72 and can be either hydraulic or pneumatic as desired. The cylinder 30 does have a cylinder rod 32 projecting therefrom, the outboard end of which is secured to mounting brackets 33 and 34 which are intended to engage the heat control assembly 80 and move it in the direction of the arrow 90 into and out of the bite of the press. Bracket 33 also has legs 33a, 33a which are of suitable size and configuration to be inserted into recesses 12, 12 of bottom plate 10 to insure proper alignment when cylinder 30 is in the full line position of FIG. 1.

Figure 4:
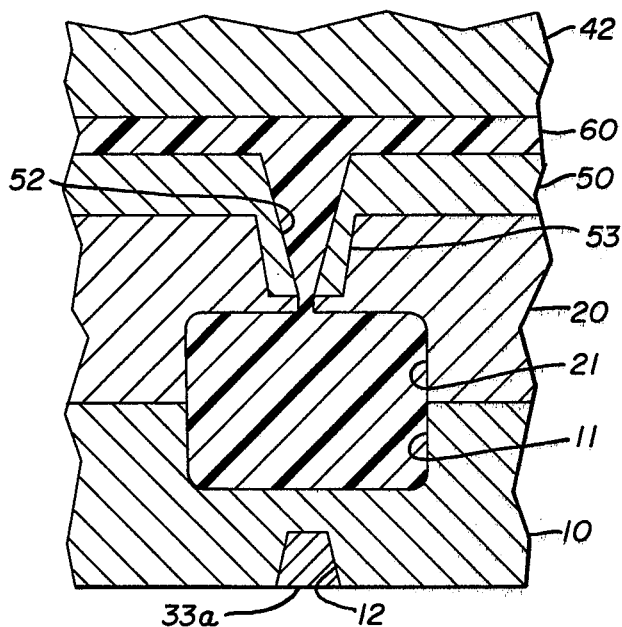
FIG. 4 is a fragmentary section of the assembly showing the relative position of the members during the injection stage.

In use or operation of the improved apparatus, reference is first made to FIG. 4 of the drawings wherein it will be noted that the lower platen 15 (see FIG. 1) has been activated to move the top and bottom mold plates 10 and 20 into contact with the pot closure plate 50. The configuration of the rib 53 of the plate 50 corresponds with the configuration of the recess 22 of the top mold plate so that a secure engagement between surfaces 53a and 22a is achieved.

In this regard, rib 53 is of sufficient depth to permit such engagement in order to eliminate, or at least minimize, the problem of flash or back rind in this area. On the other hand, the transverse dimensions of rib 53 and recess 22 are such that their respective sidewalls are spaced from each other. Since top plate 20 has its temperature elevated during the curing cycle, flush engagement between rib 53 and recess 22 could cause that heat to be transmitted to rib 53 and thus to the material in sprue opening 52. The result could be that this material would inadvertently be cured and thus become waste. The air space between rib and recess sidewalls is believed to be sufficient to prevent this.

With the apparatus in this position, the material 60 is injected by operation of the transfer pot ram 42 and forced from the pot cavity 43a through the sprue openings 52 of the closure plate 50 through the gate 23 and thus into the cavity formed by the openings 11 and 21 of the top and bottom mold plates 10 and 20.

Figure 5:
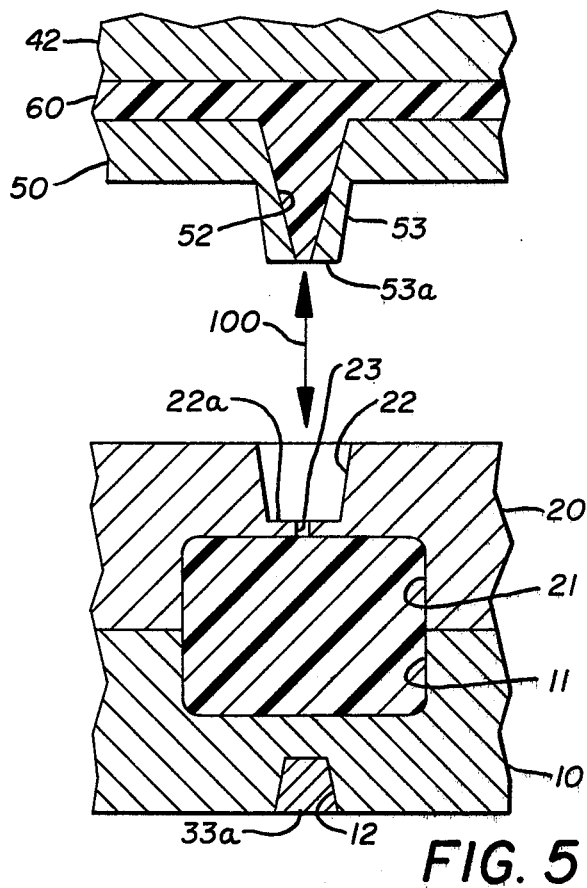
FIG. 5 is a view similar to FIG. 4 showing the components separated following injection.

Referring to FIG. 5, once injection has taken place, the clamping pressure of the press is relieved and the components are separated so that the mold plates 10 and 20 are drawn away from the closure plate 50 in the direction of the arrow 100.

At this time, the cylinder 30 is actuated and moves the heat control assembly 80 into the bite of the mold in alignment with the top mold plate 20. At this point, the ribs 86 of the heating assembly will slide into the recesses 22, 22 of the top mold plate, and legs 33a, 33a of bracket 33 will engage recesses 12, 12 so that heating assembly 80 is in alignment with plate 20.

At this point, clamping pressure is reapplied and bottom platen 15 is again moved upwardly to trap assembly 80 between closure plate 50 and mold plate 20, and heating element 80 can be activated for curing purposes.

Several things should be noted at this point.

First of all, the necessary heat to cure the material 60 contained in the cavities 11 and 21 of mold plates 10 and 20 can be supplied by heating element 87. This heating element, however, is effectively separated from the pot material which remains in the cavity 43a so that it may remain below scorch and in a completely uncured state. Therefore, there is no waste at all with regard to this material, nor is there waste with regard to any material contained in the sprue openings 52; because the elevated curing temperature necessary to cure the article formed in the cavities 11 and 21 is prevented from reaching either the pot or sprue material.

Furthermore, the sprue configureation and primarily the rib configuration 83b 83b permits air to circulate between the heating element 80 and the sprues, thereby further insuring that a sufficiently low temperature is maintained in this area.

As a result of this construction, the only waste material would be the minimal amount contained in gate 23.

A further advantage is obtained by the positioning of the heating element 87 which, it will be noted, is very close to the injected material, thereby achieving a faster and more efficient cure.

Once the cure has taken place, the clamping pressure of the overall press assembly will be relieved and the parts separated so that the cylinder 30 can be actuated to move the heat control assembly 80 to the broken line position of FIG. 1, following which the mold can be stripped in conventional fashion and the cycle can be repeated.

One further feature of the form of the invention illustrated lies in the coaction between bottom surface 86a of ribs 86 and surface 22a of recess 22. Notwithstanding the surface to surface contact between surfaces 53a and 22a during the injection cycle, some back rind or flash may occur therebetween. If this is not removed, it may eventually find its way into cavity 11, 21 and contaminate the next charge.

However, when assembly 80 is moved to the left of FIG. 1, surface 86a of rib 86 will slide along surface 22a of recess 22 and will effectively strip this material from surface 22a.

While a full and complete description of the invention has been set forth in accordance with the dictates of the Patent Statutes, it should be understood that modifications can be resorted to without departing from the spirit hereof or the scope of the appended claims.

Thus, while part of the method for isolating the pot material from the cavity material is shown as the utilization of air circulation through passages 83a, 83a, it is possible that the plates of assembly 80 could be cored for water circulation to further supplement the cooling.

Furthermore, while as a preferred embodiment, the rib configuration of the pot closure plate 50 has been illustrated, the same overall principles of operation could be applied without using the ribs wherein the bottom surface of plate 50 could be flat and the top of the top mold plate 20 could likewise be flat, with only the gate 12 providing access to the interior of the molding cavity. In such a variation, the ribs 86 of plate 85 could also be eliminated.

Finally, while the invention has been described in conjunction with a fixed upper platen and movable lower platen, it obviously could be used with a press operating in reverse fashion.

I claim:

1. Injection molding apparatus for use with a press movable between open and closed positions, comprising:
    (A) a heated material supply source carried by one platen of the press;
    (B) cavity bearing mold plates carried by the remaining platen of the press;
    (C) a mechanical temperature control assembly including
        (1) at least top and bottom rigid support plates,
        (2) a layer of insulating material disposed beneath said top support plate, and
        (3) at least one heating element disposed between said layer of insulating material and said bottom support plate;
    (D) lateral transfer means
        (1) disposed externally of the press for movement toward and away from said press and
        (2) secured to said temperature control assembly;
    (E) support means supporting said temperature control assembly in a position external to said platens to allow said material supply source to be moved into and out of contact and fluid communication with said cavity bearing mold plates upon movement of said platens;
    (F) said temperature control assembly being sequentially movable between positions completely into and out of said press between the platens and between said material supply source and said cavity bearing mold plates upon opening thereof and actuation of said transfer means; and
    (G) said material supply source contacting said top support plate and said cavity bearing mold plates contacting said bottom support plate upon closing of said press.

2. The apparatus of claim 1 wherein
    (A) said cavity bearing mold plates have at least one elongate recess in their top surface; and
    (B) said bottom support plate of said temperature control assembly has at least one complementally shaped elongate projection on its bottom surface for engagement with said elongate recess.

3. The apparatus of claim 1 wherein said temperature control assembly further includes cooling means disposed between said insulating material and said heating element.

4. The apparatus of claim 1 wherein said temperature control assembly further includes:
    (A) an intermediate plate
        (1) disposed between said insulating material and said bottom support plate, and
        (2) having alternating ribs and grooves on its bottom surface.

5. The apparatus of claim 1 wherein said transfer means include:
    (A) a support member;
    (B) a retractable piston carried by said support member; and
    (C) one end of said piston being secured to said temperature control assembly.

6. The apparatus of claim 1 wherein
    (A) said mold bearing plates have a plurality of notches opening into their bottommost surface; and
    (B) alignment members carried by said transfer means for engagement with said notches.

7. A method of injection molding using a press movable between open and closed positions and carrying a heated material supply source and a cavity bearing mold including the steps of:
    (A) closing the press and injecting a charge of fluid material below scorch temperature for that material from the material supply source directly into the cavity of a cavity bearing mold;
    (B) opening the press and releasing clamping pressure and moving the material supply source away from the cavity bearing mold;
    (C) moving a temperature control assembly from a position completely outside of the press to a position completely within the press and seating it on said cavity bearing mold;
    (D) reapplying clamping pressure and moving said cavity bearing mold toward said material supply source with said temperature control assembly interposed therebetween; and
    (E) inducing molding heat into said temperature control assembly.

8. Molding apparatus for use with a press having relatively movable upper and lower platens, cavity bearing mold plates and a heated material supply source, comprising:
- (A) the material supply source being carried by the upper platen for movement therewith;
- (B) a closure plate
  - (1) carried by the upper platen in communication with said material supply source
  - (2) and having at least one material discharge opening therein;
- (C) said cavity bearing mold plates being
  - (1) carried by the lower platen
  - (2) and having at least one gate opening communicating with at least one molding cavity;
- (D) said material discharge opening and said gate opening being in vertical alignment for engagement upon movement of said upper and lower platens toward each other;
- (E) a mechanical temperature control assembly attached to said lower platen for vertical movement therewith and including
  - (1) at least top and bottom rigid support plates,
  - (2) a layer of insulating material disposed beneath said top support plate, and
  - (3) at least one heating element disposed between said insulating material and said bottom support plate;
- (F) transfer means
  - (1) secured to said lower platen for movement therewith and movable toward and away from the press and into and out of the space between said upper and lower platens
  - (2) and attached to said temperature control assembly; and
- (G) support means supporting said temperature control assembly in a position external to said platens, said temperature control assembly being movable between positions completely into and out of said press between said material supply source and said mold plates upon movement of said upper and lower platens away from each other and actuation of said transfer means.

9. The apparatus of claim 8 wherein
- (A) said closure plate has at least one depending rib which contains said material discharge opening;
- (B) said cavity bearing mold plate having at least one elongate recess containing said gate opening;
- (C) said rib and said recess having complemental mating configurations.